United States Patent [19]

Skala

[11] 3,943,525

[45] Mar. 9, 1976

[54] INK PRINTER AND METHOD OF PRINTING WITH CAPILLARY CONTROL OF PRESSURISED INK

[76] Inventor: Stephen F. Skala, 3839 S. Wenonah, Berwyn, Ill. 60402

[22] Filed: Apr. 13, 1973

[21] Appl. No.: 350,943

[52] U.S. Cl................ 346/1; 178/6.6 R; 346/140 R

[51] Int. Cl.²........................................... G01D 15/16

[58] Field of Search............. 346/75, 140, 1, 74 EX, 346/78, 141; 178/6.6 R

[56] References Cited

UNITED STATES PATENTS

| | | | |
|---|---|---|---|
| 3,091,762 | 5/1963 | Schwertz | 346/74 E X |
| 3,157,456 | 11/1964 | Kikuchi | 346/78 |
| 3,582,954 | 6/1971 | Skala | 346/1 |
| 3,732,573 | 5/1973 | Merka et al. | 346/74 E X |

*Primary Examiner*—Raymond F. Cardillo, Jr.
*Attorney, Agent, or Firm*—Dominik, Knechtel, Godula & Demeur

[57] ABSTRACT

A system and method for printing by delivering monodisperse ink drops from a capillary array to a paper surface in an electrostatic field. Forces within selected capillaries allow said capillaries to be filled with ink from a supply which enters the capillary through a communication port. A valving and motor action is provided to open and close said ink port in a selective manner, said actions provided by a body of mercury partly filling the capillary under pressure, by developing a magnetic field within the capillary, and by inducing a potential between electrodes in a capillary which causes current flow across the magnetic field which results in a force that moves the body of mercury to open the communicating port. Terminating current flow restores the mercury in partly filled relationship within the capillary to again close off the port. The electrodes are energized to correspond with electrical graphic information which is preferably expressed through a switching assembly wherein a first set of switches are controlled by a signal which provides information for modulating the capillary filling in parallel, by a second set of switches which are operated by a synchronizing signal for sequencing scan, and by a third set of switches which provide current of proper direction in a circuit which shares an electrode with two capillaries. All switches are reset by another synchronizing signal occurring at the beginning of a new line of dots.

A programmer automatically controls printing of preselected pages.

12 Claims, 11 Drawing Figures

FIG. 2 FIG. 3 FIG. 4
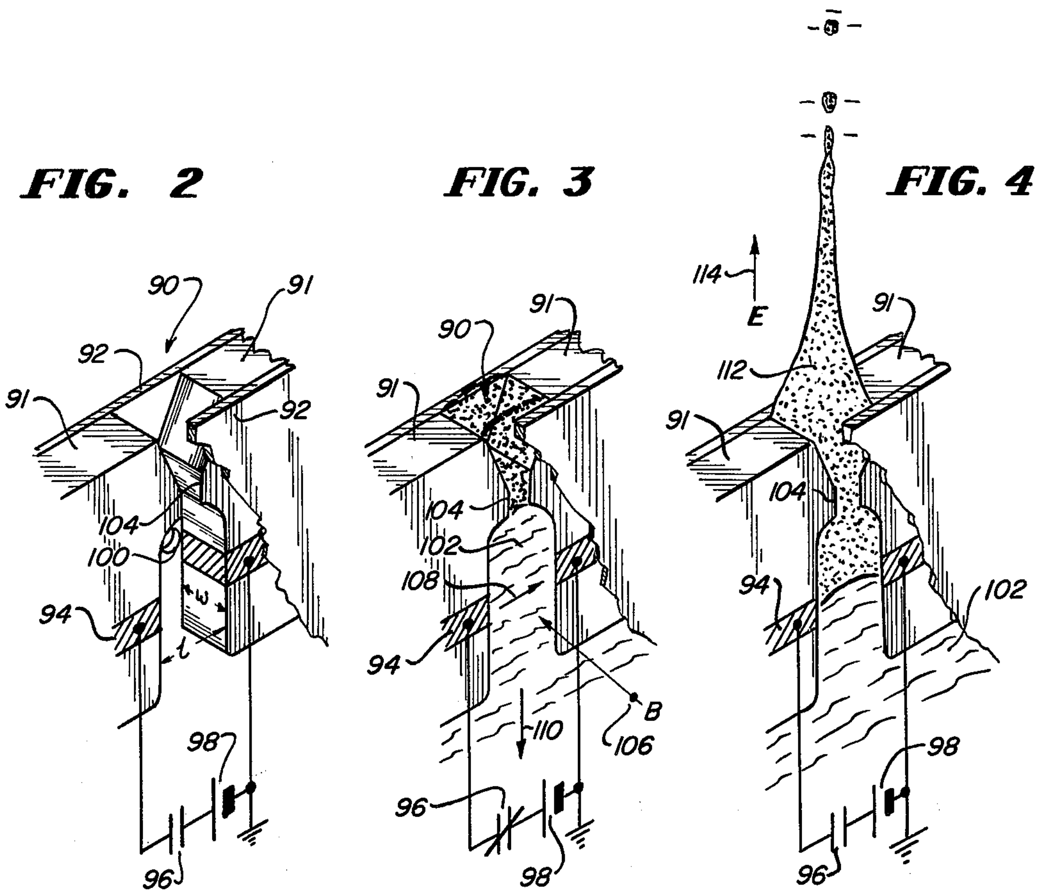
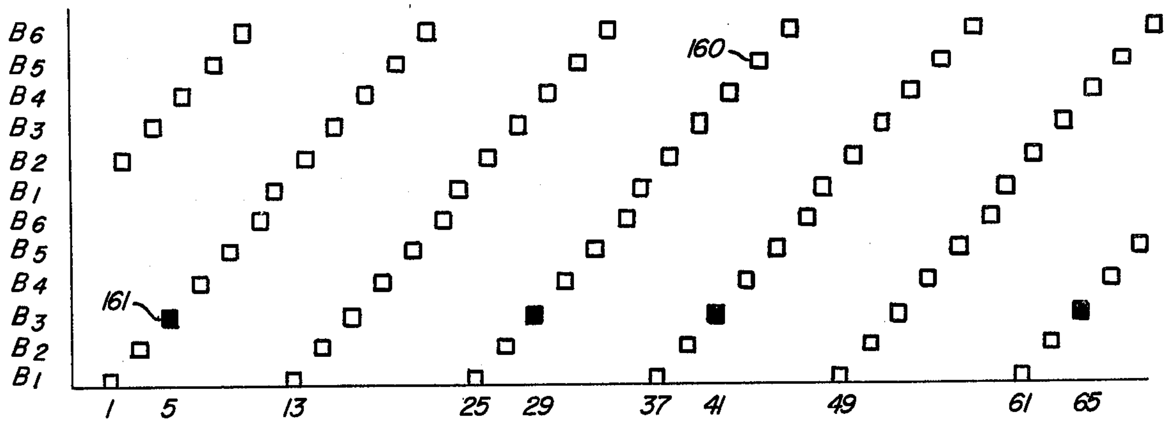
FIG. 8
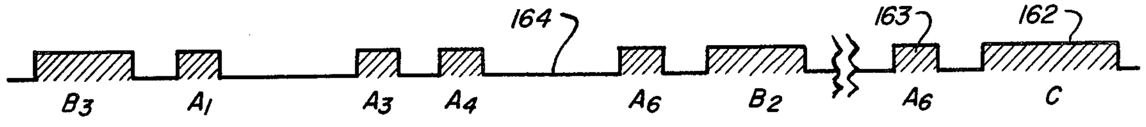
FIG. 9

INK PRINTER AND METHOD OF PRINTING WITH CAPILLARY CONTROL OF PRESSURISED INK

This invention relates to a method and apparatus for selectively delivering ink drops from an array of capillaries; and the invention more particularly relates to a method and apparatus whereby such selective means allow the ink drops to be deposited on a paper surface in response to broadcast signals to attain a printed publication in the homes of individuals.

The present invention is concerned with an area designated as electronic publishing. This term is intended to mean the recording by printing of characters and illustrations in response to electrical information signals which are sent from a source remote from the place where the printing is performed. the advantages of such a system and method will be readily appreciated, particularly when considering the virtually limitless flexibility and choice of subject matter which can be preprogrammed for printing by an individual for his diverse interests. The capacity for presenting information in an ordinary newspaper is understandably limited by space to a standard presentation which is preselected by an editor for the anticipated interests of an average reader.

Information processing systems which convert test to signals and then to a representation of a composed page have been variously described in the art, for example, see M.E. Stevens, "Automatic Typographic Quality Techniques" National Bureau of Standards Monograph 99, 1967. See also "Research and Development in the Computer and Information Sciences," N.B.S. Monograph 113, Vols. 1 and 2, 1970. Generally, the processed signal is stored and then transmitted as an electromagnetic wave through space or in a cable. The general technology and apparatus for modulation and transmission of such information signals are known in the art. Such available knowledge is utilized in the present invention, generally in the area of electronic publishing. Such electrographic information is received in the form of radio signals in an electronic publishing system and apparatus. The technology and apparatus for receiving such signals are also generally known. Other technologies utilized in the invention, for example mechanisms for handling rolls of paper on which the information is printed, are used in facsimile and copying machines. Some of these technologies have also been applied to electronic publishing, for example, by J. Regunberg in U.S. Pat. No. 3,479,451.

The term "printing" suggests any process which records an image on a surface. The printed information is presented as selected areas contrasted with a background. It is known that selected area may be transformed portions of an active surface as in photography, or they may be deposited on a passive surface as in impact printing. Energy is expended in forming an image. One form of energy may have specifically a selective function, which another form of energy may be applied commonly, such as to the bulk of ink, or to the image receiving surface. An example of such forms of energy, which together provide an image, is the selective photo excitation of silver halide followed by a commonly applied chemical development which transforms excited silver halide into silver metal. Another such example of selective and common forms of energy providing an image is selective deposition such as gravure. Commonly functioning processes transfer liquid ink from a bulk source into small holes in a roll which then contact paper into which ink flows to form small dots. The selective process involves photo chemical etching during preparation of the printing roll.

Some printing systems which have particular applications require specialized materials and equipment such as special paper surfaces having photoconductive features, structured inks such as in ribbons, and the various costly components involved in xerographic copiers. Understandably, the most widely used method and system of publishing is by selective deposition of bulk liquid ink on ordinary paper.

It is recognized that liquid ink and ordinary paper can be adapted to various forms of electronic publishing. In one such example, an ink mist is charged, the mist particles are guided by a selective electrostatic field such as is caused by a latent charge image, and the mist particles are intercepted by a photoconductive surface. The deposited ink is then transferred to paper. Such teaching is exemplified in U.S. Pat. No. 3,052,213 issued to R.M. Schaffert.

Another printing method utilizing liquid ink which can be applied to electronic publishing involves ejecting a spray from selected orifices in a group or array of such orifices. One example of this teaching is shown by M. Naiman in U.S. Pat. No. 3,179,042 wherein sudden steam pressure generated by a miniature electric heater blows ink from selected orifices.

Still another method of printing with liquid ink which can be applied to electronic publishing is shown by E. Mutschler in U.S. Pat. No. 3,334,354. A pin reciprocating within an orifice causes an ink meniscus to contact paper and deposit ink.

In all of the foregoing examples of prior art signal responsive printers using liquid ink, a signal is transferred into a force which selectively imparts energy to a portion of ink to control its motion. Additional energy acting more commonly may be provided to separate a portion of ink from its bulk source. An example of these two energy functions is provided by the deposition of an ink mist on a latent electrostatic image. One form of energy acting more commonly forms a mist. A second form of energy acting more selectively propels the mist to the electrostatic image. Forces such as those associated with an electrostatic image which selectively and directly impart energy to a portion of ink are herein designated "selective means". The selective means in the sudden steam printer is pressure within the ink source with selection and separation of ink combined into one process. Contact transfer of ink requires only selective energy to be provided since liquid ink readily flows onto paper.

The foregoing examples of prior art are not completely satisfactory for electronic publishing since ink transfer based on mist, spray, or contact is difficult to control with graphic arts precision.

A preferred group of printing methods using liquid ink which can be applied to electronic publishing is based on the separation of uniform drops from a bulk source of ink. It is known that such drops can travel across a substantial gap for deposit on paper. The art has provided means for controlling the trajectory, size, and electric charge of the drops. There are two known methods for forming such drops. In one method, ink is ejected under substantial pressure as a cylindrical body or jet. An oscillation communicated to the jet together with its surface instability causes the jet to break into uniform drops. Such drop formation may be designated "jet mode". In the other method, hydrostatic pressure is used in combination with other forces such as an electrostatic field to draw electrically charged ink from a capillary which detaches as drops. Such drop formation may be designated "drip mode". Various common aqueous inks may be used to form the monodisperse drops, by both the jets and drip modes, to form sharp dots which dry rapidly on ordinary paper. A wide range of drop sizes is feasible, and images of satisfactory graphic quality can be printed. Characteristic sizes of dot images and the printer's drop forming structures are on the order of several mils, and a characteristic time for forming and depositing drops is on the order of a millisecond. Properties of drops formed by the jet mode may be found, for example, in U.S. Government Report AD 437 951 "High Frequency Oscillography with Electrostatically Deflected Ink Jets" by R. Sweet. Properties of drops formed by the drip mode may be found, for example, in Proc. Nat. Elec. Conf. 1969, Vol. 25, "Electrical Generation of Collimated Beams of Uniform Charged Particles" by S. Sample.

It is desirable to utilize drops in an electronic publishing system and to deposit these drops selectively on paper, preferably utilizing electric potentials for the selective means. The art has considered various methods of printing with drops wherein the selective means is behind the paper, on the paper, between the paper and ink source, on the ink source, or within the ink source, An example of a printer with the selective means behind the paper is shown by C. W. Hansell as one of the embodiments in U.S. Pat. No. 2,143,376. Hansell moves paper over a linear array of electrodes, and each electrode can be switched to a voltage source. As drops pass an electrode which is connected to the voltage source, they are attracted and intercepted by the paper.

A selective means on the paper with selection by electric potentials, implies a latent electrostatic image. In The practice of xerography, ink particles in suspension or otherwise relatively static, deposit on such a latent image. Reference may be made, for example, to "Electrofax" by C. J. Young, RCA Review, Dec. 1954. A direct substitution of drops having substantial momentum for the particles in suspension results in a dynamic dystem where the tradjectory of the drops is difficult to control due to their tendency to overshoot. As an example of such a, a curtain of drops traveling paraellel to the paper would be deflected selectively by a charge image. Another method disclosed by Schaffert in the patent cited previously, used the charge image to participate in the selective formation of an ink mist. A similar principle using capillaries operating in the drip mode would case drops to deposit on the charge image. The selective means in such a system is both the charged image on the paper and the charge induced on ink protruding from capillaries which eject drops selectively. It is understood that paper associated with a retained charge image is of a special kind.

Examples in the prior art which show the selective means between the paper and the ink source include U.S. Pat. No. 2,600,129 issued to C. H. Richards and U.S. Pat. No. 3,373,437 issued to R. G. Sweet. In both of these teachings, the basic printer has a source of charged drops. The charged drops are then deflected in an electrostatic field. The deflected drops are either removed from the drop stream or the trajectories are varied over a continuous range. Such a continuous range may be provided by charge variation on the drops or by variation of the electrostatic deflection field. The formation and deflection of drops in this kind of printer is analogous to the modulation and sweep of an electron beam in a cathode ray tube.

Printers are known in the art which have the selective means on the ink source, which eject ink selectively, and which form drops only in the drip mode. Such examples are found in U.S. Pat. No. 3,480,962 issued to J. W. Weigl and in U.S. Pat. No. 3,693,179 issued to S. F. Skala. Generally, ink under slight hydrostatic pressure protrudes from each capillary in an array into an electrostatic field. The protrusion is stable until charge flows to the ink surface protruding from selected capillaries and causes ink to be withdrawn and to form drops. The charge which causes energy to be imparted to ink in selected capillaries and is thus the selective means can be controlled by various methods. Weigl teaches control of charge by selectively illuminating photoconductive ink within capillaries which modulates electron flow within the tank. The signal is first transformed to light and is then transformed to a variable ink resistance. Skala teaches control of charge by a modulated swept electron beam. The beam current flows to the protruding ink surface.

It is a particular object and advantage of the present invention to generally utilize printers which have the selective means within the ink source, and which printers produce drops. The invention has a particular object to provide improved selection means in such a general printer. A printer of this general structure and operation has been shown in U.S. Pat. No. 3,582,954 issued to S. F. Skala, the present applicant. Skala teaches forcing ink only into selected capillaries so that any emerging ink is acted upon by additional forces such as are provided by an electrostatic field. Selective means within the ink source has an advantage over selective means on the ink source in that various forces acting commonly on all protruding ink may be combined to provide desirable ink drop characteristics.

Still another particular object and advantage of the present invention is to attain selective means within the ink source through a valving action of an electromagnetic pump. Such a pump, which originated with Faraday, is an elementary electric motor in that electric current crosses a magnetic field to result in a force utilized to particular advantage in providing the valving action. The expression for the vector relation between force (F), current (i), magnetic field (B) and gap (l), between electrodes is stated by:

$$\bar{F} = i\bar{B}\times\bar{l}$$

The art has recognized that electromagnetic pumps may be applied to valve operators where small channels are used to develop high pressures, as shown in U.S. Pat. No. 3,274,778 issued to J. M. Tyrner. Also recognized in the art are printers using an electromagnetic pump in which electric current flows directly through conductive liquid ink which flows selectively onto paper as shown in U.S. Pat. No. 3,359,566 issued to D. J. Donalies.

It is another object and advantage of this invention to employ a liquid metal which is induced to move or flow from the force resulting from the electric current crossing the magnetic field. Mercury is used to particular advantage as the liquid metal because it is chemically stable and is not consumed during operation or movement. Also, mercury can remain in prolonged contact with materials such as steel, nickel, glass, various plastics and ceramics without deterioration to the mercury or such material. Yet still another advantage of using mercury to attain desired valving action of an electromagnetic pump arises from the mercury being stored under a body of aqueous ink used in the printing, such ink retarding oxidation of the mercury from atmospheric sulfide. Yet another object and advantage is to utilize mercury because of its high surface tension which can be used to prevent the flow of mercury through constrictions or ink ports.

Still yet another object of the present invention is to attain advantages by providing an improved switching assembly and method which controls the individual printing elements or capillaries in a linear array. Generally, switching methods are known for printers wherein a voltage is applied to two power inputs of the printer. One example which utilizes a switching method in such a way is the sudden steam printer previously cited; and another example is the generally known solenoid dot matrix printer in which a pin is operated to press a inked ribbon onto paper.

An aspect of the immediately preceding object involves an improved assembly and method for utilizing printing elements with two power inputs combined in a linear array in such a way that the inputs can be controlled by a smaller number of switches used in various combinations. Numerous types and kinds of switches can be used for this purpose, which have desired characteristics of low impedence when energized, and high impedence when not energized. Switches are employed which provide a desired response time following energization.

Still another aspect of the general object relating to improved switching method and assembly is to utilize the known combination of switches into groups to provide basic switching functions. It is known, for example, that a stepping switch and a ring counter can provide connections cyclically. It is also known that a serial to parallel register provides selection simultaneously. Both types of switches are used to advantage in an improved manner in the present invention. In particular, electromagnetic pumps are selectively energized by developing a voltage between a pair of electrodes in a capillary or printing element through preselected combinations of switch closures.

Another particular aspect of the foregoing objects relating to the improved switching method and assembly relates to controlling groups of switches for printers which operate printing capillaries in parallel and scans such capillaries sequentially in response to a signal which provides information for modulating drops in parallel by a synchronizing signal for sequencing the scan, and by still another synchronizing or master reset signal to control the start of a printing line.

Still another important object of this invention is to attain advantages by providing a programmer which automatically causes pages to be printed at times preselected from a schedule. Since a printed medium records information, pages can be printed at any hour for reading at a convenient time. Generally, programmed timers are known which cause switches to close at preselected times. One example of such a programmed times has a paper cylinder with punches holes driven by a clock motor. Metal bruch contacts pass through the punched holes to complete a circuit. Another example of such a programmed timer has movable projections which function as cams. An aspect of the object relating to programmed selection of pages is an improved method and apparatus for using a tape of ordinary paper which can be marked with a pen or pencil and sensed optically to control the graphic receiver. Another aspect is that a block of information designating time and channel is adjacent to another such block, rather than separated in proportion to time interval as in other programmed timers.

The objects and advantages which have been described are now attained together with still other objects and advantages which will occur to practitioners upon considering the following disclosures of the invention, which includes drawings wherein:

FIG. 2 is a somewhat schematic perspective of an individual capillary, with portions being removed;

FIG. 3 is a view similar to that of FIG. 2 but showing the body of mercury within the capillary and further schematically indicating the dynamics of movement under a resultant force following passing of a current through a magnetic field;

FIG. 4 is a view similar to previous views of FIGS. 2 and 3, except further showing a body of ink in the capillary positioned over the body of mercury, and further showing formation of drops;

FIG. 8 is a highly schematic representation illustrating the sequence of tracing a line of dots on a highly exaggerated time schedule;

FIG. 9 is a highly schematic demonstration of a sequence of pulses to represent the modulation envelope of a broadcast signal;

Figure 1:
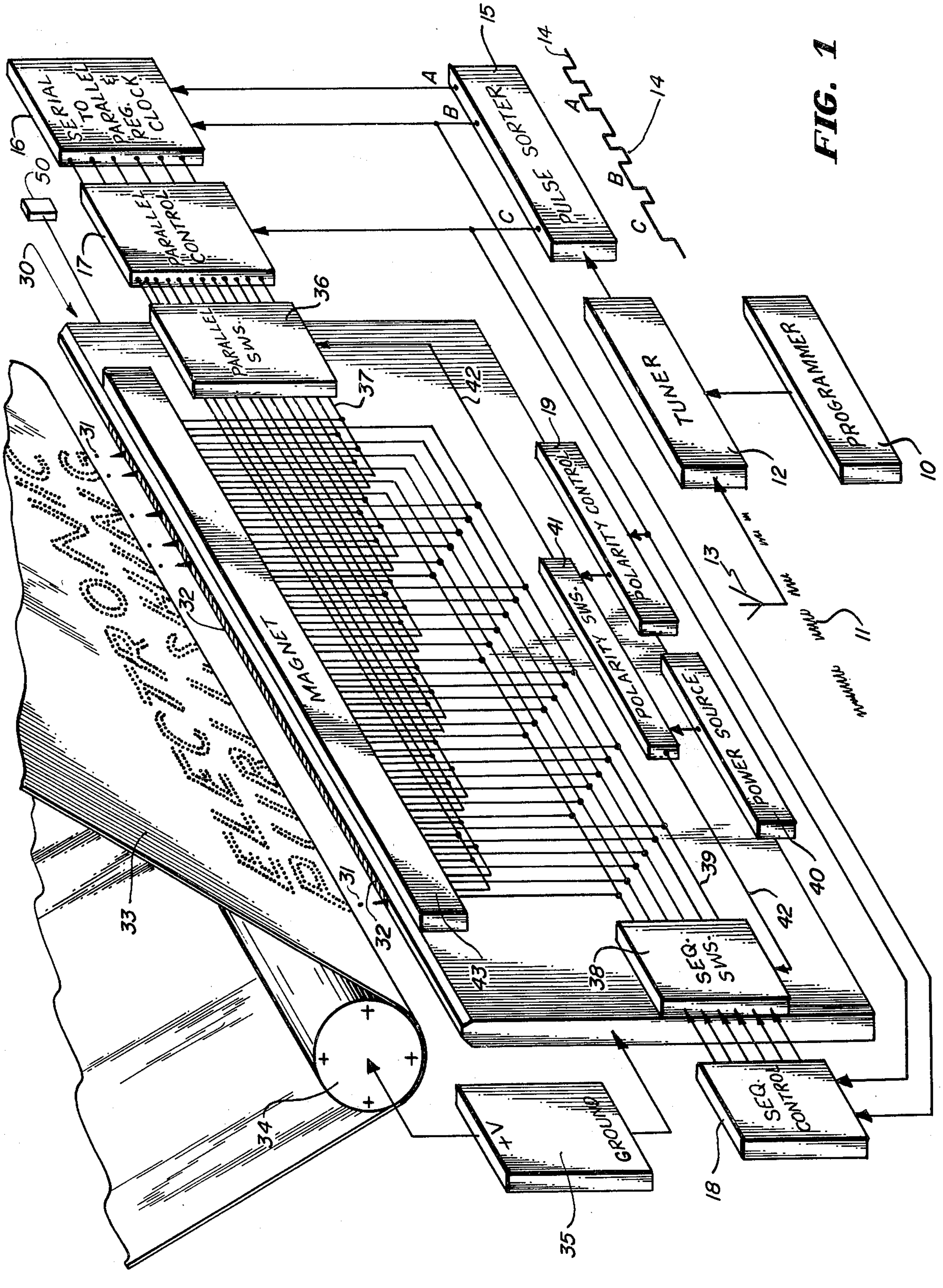
FIG. 1 is a highly schematic representation in perspective form of basic components utilized in the electronic publishing system of the invention.

The method and system for electronic publishing according to the present invention provides electromagnetic pumps for selectively moving ink into protrusion from a capillary well so that an external force such as an electrostatic field may induce travel of the drops to a paper surface across a gap or space. The electromagnetic pumps disclosed have the dual function of armature and valve. A body of mercury within a capillary flows in response to an electric current so that movement of such mercury closes or opens an ink port in the capillary structure. A simple and efficient means is provided to attain a function which would otherwise require a complex motor and a valve manifold.

The motor and valving means are positioned between two poles of a magnet. Bodies of ink and mercury are positioned to communicate with the capillaries under pressure. The mercury fills the capillary and closes or blocks the ink ports to stop ink flow. The capillary is selected for ink ejection wherein said body of mercury has stopped the ink flow, and an electric current is made to flow through the mercury within such capillary. The resultant force of the current moving through the magnetic field forces the mercury away from the ink port so that the ink, under pressure, may flow into and from the capillary in forming drops in an external electrostatic field. When the electric current is stopped, the mercury reenters or moves into the capillary to again seal or close the ink port. The surface tension of the mercury prevents it from entering the ink port, or passing through a constricted capillary opening.

A close spacing of dots togther with a reasonable printing rate and adequate ink deposition is attained by inducing a number of capillaries to print simultaneously. A large number of capillaries is controlled by switches which are reduced in number by working them in combinations. Each capillary is selected for printing by applying a potential between its electrodes. One of the electrodes is connected to a first group of switches designated herein as A switches. The other electrode is connected to a second group of switches designated herein as B switches. Each capillary is uniquely selected by combining a switch from the A group with a switch from the B group. The A switches operate in parallel while the B switches operate sequentially. The electrodes are arranged so that the capillaries which print simultaneously are sufficiently separated to prevent interactions. The preferred embodiment presently contemplated provides sharing each electrode with two capillaries. A third set of switches is designated herein as C switches for the purpose of controlling polarity of the applied power or voltage source. Such polarity changes are required to provide current with a constant direction with respect to the magnetic field where one electrode serves two capillaries.

The various sets of switches are controlled by a signal which conveys graphic information and which provides synchronization between transmitter and receiver. The signal includes a sequence of graphic information which is herein designated as A signal components or pulses. The A pulses control the operation of parallel printing elements. Another signal component or pulse is herein designated as B, and the B pulse synchronizes scan or coordinates shifting of the printing element. A third component or pulse is herein designated as C, which pulse corresponds to completion of a scan cycle and functions as a master reset. Although various kinds of modulation are feasible, a sequential signal with the A, B and C components varying in pulse width is preferred.

The various signals or pulses control printing through switches which respond to digital logic circuits. The A signal components are clocked into a serial to parallel register which controls the A switches. The B signal components causes a ring counter to step in sequence to the B switches. Gates function to assure proper direction of current flow with respect to magnetic field.

The printers preferably are assembled as laminates which are prepared by means such as photofabrication or electric discharge machining presently known in the circuit and package manufacturing arts. Such methods allow the complex miniature printer structures to be made accurately and economically. The electrical connections and crossover are effected by selectively bonding or insulating the various thin layers or sheets.

Selection of pages is controlled by a programmer having a pencil marked paper tape. The pencil marks which designate time and channel are sensed optically. When the time marked on the tape coincides with clock time, the graphic receiver is turned on.

Referring now to the drawings, the basic components of the receiving portion of an electronic publishing system are shown in FIG. 1. At a preselected time, programmer 10 automatically starts the receiver. A pulse modulated radio signal 11 enters a tuner 12 through an antenna 13. The functions of selection, amplification, and detection are provided by the tuner. Detected signal 14 has three kinds of components designated A, B and C. Pulses A represent graphic information, while pulses B and C are synchronization signals. Pulse sorter 15 responds to pulse width and sorts each kind of pulse into a separate channel. A serial to parallel register 16 clocks in pulse A, and then transfers accumulated A pulses on a pulse B into parallel control 17. Sequential control 18 advances one position on a B pulse to step another set of switches sequentially. Polarity controls 19 alternates as sequential control 18 completes a cycle. A C pulse assures that all switches are reset and synchronized with the signal.

Assembly 30 is in printer portion which includes a reservoir and source of pressure for ink and mercury shown as 50. Drops of charged liquid ink 31 are selectively ejected from a row of capillaries 32, and are attracted to a sheet of paper 33 moving over a metal roll 34 maintained at a potential by power supply 35. Ink ejection is controlled by current flowing between a pair of electrodes, not shown in FIG. 1, associated with each capillary 32. One of the electrodes in a pair is connected to a switch in parallel A switches 36 through a representative conductor 37. The other electrode is connected to one of sequential B switches 38 through a representative conductor 39. Switches 36 and 38 are connected to power source 40 through a polarity C switch 41 and a representative conductor 42. A magnet 43 spans the row of capillaries 32.

FIG. 2, 3 and 4 show an elementary embodiment of a capillary printer valved by a liquid metal electromagnetic pump. In FIG. 2 a capillary 90, having dimensions 1 and w, is defined by plate 91 and sheets 92 which are electrical insulators. Metal electrodes 94 are connected to a switch 96 and a power source 98. A port 100 admits ink under pressure from a channel on the opposite side, not shown.

In FIG. 3, capillary 90 is shown in a normal passive state, filled with mercury 102 under greater static pressure than the ink of the opposite side of port 100. Capillary constriction 104 and port 100 are sufficiently small to allow the surface tension of mercury to prevent its leakage. Mercury seals the port so that ink cannot flow. A constant magnetic field 106 passes through the region of electrodes 94. When switch 96 is closed, current 108 flows through the mercury resulting in downward force 110 which overcomes the static pressure on the mercury and moves it downward.

In FIG. 4, mercury has cleared ink port 100 and ink 112 flows through the capillary into electric field 114. Charge flows to the ink surface drawing it into an elongated form from which drops are released. When switch 96 is opened, static pressure on the mercury moves it upward, and forces out the remaining ink while sealing the ink port.

Figure 5:
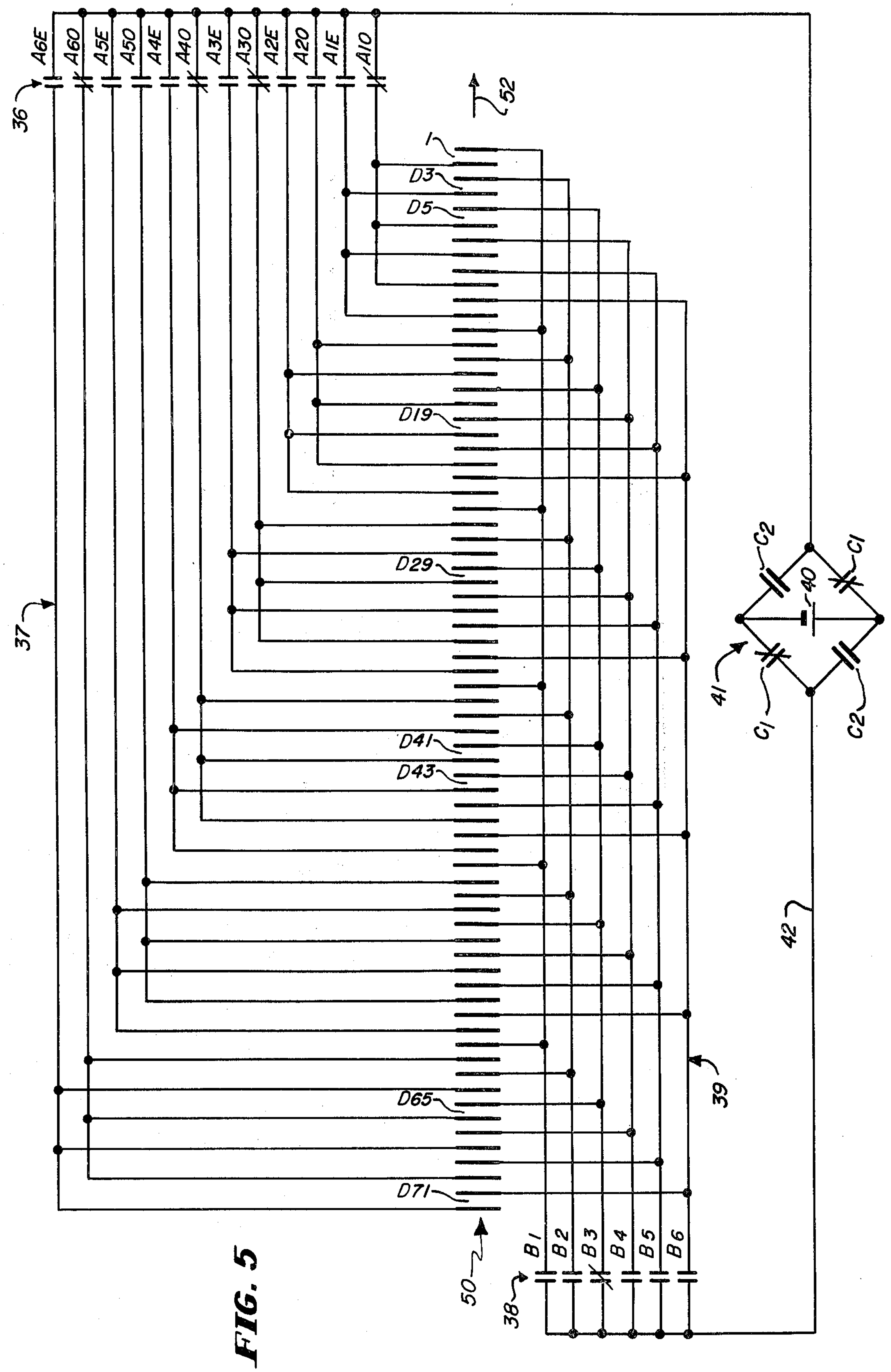
FIG. 5 is a highly schematic circuit showing capillary electrodes, connecting paths and switches.

FIG. 5 shows the configuration of switches which control power to capillary electrodes. A plurality of adjacent electrodes 50 flank capillaries D1 through D71 between each adjacent pair. A capillary is selected by applying a voltage with proper polarity between its adjacent electrodes. Each capillary is uniquely energized by a particular combination of switch closures. The set of A switches 36, which can be energized in parallel, is controlled by signals pulses A. The individual A switches are further designated with numerical subscript and a letter subscript E or O. A second set of B switches 38 responds to signal pulses B. Individual B switches are further designated with a numerical subscript and are energized cyclically. A third group of switches 41 in a bridge configuration are designated C with a subscript 1 or 2, and are energized alternately in pairs to apply alternate polarities of power source 40 to the A and B switches. Representative conductors 37, 39 and 42 connect the switches to electrodes 50. Electric current flows through a portion of a capillary between an adjacent pair of electrodes. The allowed direction of current flow in the illustrated embodiment is indicated by arrow 52.

An example of capillary selection is given by the following combination of switches:

$A_{10,30,40,60}B_3C_1$

The direction of current flow, determined by the C switches, is from the A switches to the B switches. The capillaries selected for printing are numbered D5, D29, D41 and D65. When a B pulse is received, the A switches open, B steps to the next position $B_4$ and a new set of A switches is energized, such as:

$A_2E,_4E\ B_4C_1$

Current then flows the proper direction through capillaries D19 and D43.

Figure 6:
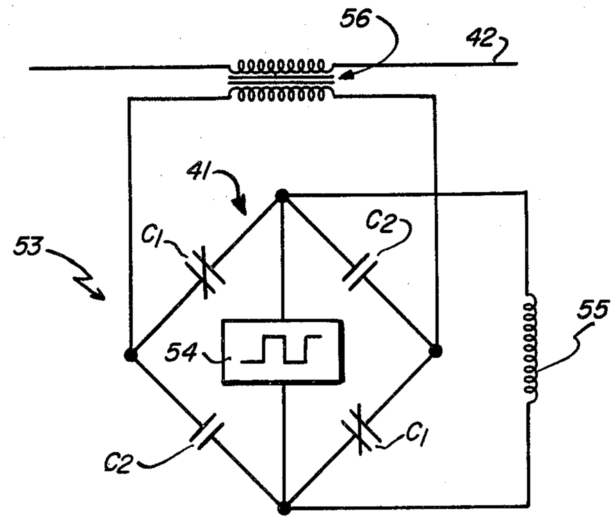
FIG. 6 is a highly schematic circuit demonstrating an alternative method of providing power to the electrodes shown in the view of FIG. 5.

An alternative method of providing power to the electrodes shown in FIG. 5 is shown in the view of FIG. 6. The power source 53 would be connected to conductor 42 in place of the C switch bridge 41 with power source 40 shown in the view of FIG. 5. An alternating power source 54 connects to transformer 56 and to field coil 55 of an electromagnetic which replaces magnet 43 in FIG. 1. Switches 41 provide the proper phase relation between current and magnetic field.

Figure 7:
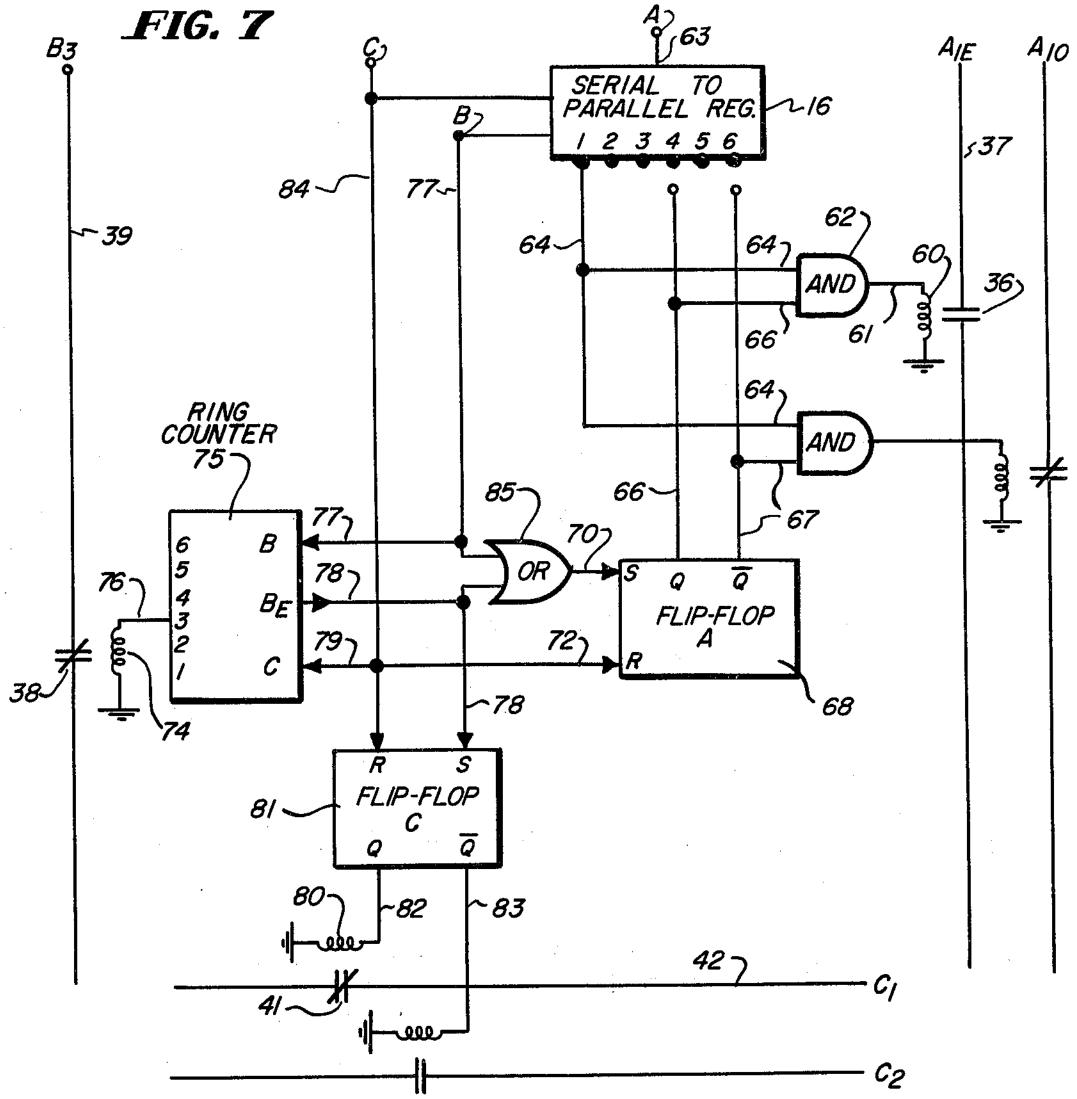
FIG. 7 is a highly schematic circuit showing representative portions of the switching system.

FIG. 7 shows control methods for the A, B and C switches in FIG. 5. An A pulse is conveyed on conductor 63, a B pulse on 77, and a C pulse on 84. Coil 60 controls switch 36, and a positive pulse at 61 causes switch 36 to close. An AND gate 62 has an output at a HI logic level when both inputs 64 and 66 are HI. The logic level at 64 is determined by serial to parallel register 16. Logic levels at 66 and 67 are opposite as determined by the output states of A flip-flop 68. A positive pulse on data input 70 causes outputs 66 and 67 to change logic levels. A positive pulse at 72 resets A flip-flop 68. Each of the A switches, such as $A_{1E\ and\ A10}$, has its own AND gate 62. One serial to parallel register 16 and one flip-flop 68 controls all the A switches.

Coil 74 controls B switch 38. A ring counter 75 is HI on one of its outputs 76 and LO on the other outputs to the B switches. The HI output steps to the next position when a B pulse is received at 77. As the ring counter completes a cycle and returns to its original position, a HI output occurs at 78. A positive pulse at 79, which occurs on a C pulse, resets the ring counter to its initial position if required. All of the B switches are controlled by a single ring counter.

The C switches, represented by contact 41 and coil 80, are controlled by C flip-flop 81. In the transition between the final and initial position of the ring counter 75, a HI pulse at 78 causes outputs 82 and 83 on the C flip-flop 81 to reverse. Alternate pulses 78 are received by flip-flop substantially coincidental with C pulses 84. The C pulses assure proper reset by overriding other inputs. Proper direction of current flow through the capillaries results from coordination of A flip-flop 68 with C flip-flop 81. An OR gate 85 has a HI output with a HI level on either 77 or 78. The pulse on 78, which occurs when the ring counter completes a cycle, causes A flip-flop to change the associataion of $A_E$ switches from even numbered B switches to odd numbered B switches at the same time that flip-flop C changes the polarity of C switches.

The control circuits include ring counter 75, A flip-flop 68 and C flip-flop 81 which operate in a regular sequence. Initially, assured by reset pulse C, the outputs of the represented control circuits are:

| | | |
|---|---|---|
| RING COUNTER | $B_1$ (76) HI | $B_{2,3,4,5,6}$ LO |
| FLIP-FLOP A | Q (66) HI | |
| FLIP-FLOP C | Q (82) HI | |

When a B pulse 77 is received,

| | | |
|---|---|---|
| RING COUNTER | $B_2$ (76) HI | $B_{1,3,4,5,6}$ LO |
| FLIP-FLOP A | Q (66) LO | |
| FLIP-FLOP C | Q (82) HI | |

The numbered B positions 76 step in sequence while A flip-flop outputs Q 66 and Q 67 alternate. As B 76 steps from $B_6$ back to $B_1$, $B_E$ 78 has a pulse output. The results are:

| | | |
|---|---|---|
| RING COUNTER | $B_1$ (76) HI | $B_{2,3,4,5,6}$ LO |
| FLIP-FLOP A | Q (66) LO | |
| FLIP-FLOP C | Q (82) LO | |

The horizontal axis in FIG. 8 corresponds to the capillaries 1 through 71 shown in FIG. 5 which would span the printed portion of a page. The vertical axis corresponds to the printing sequence and the motion of paper. With normal paper speed and capillary sizes, square 160 would appear as a fine line of dots across the paper. The exaggerated representation illustrates the sequence of a printed line. The squares aligned at 161 correspond to the capillaries of FIG. 5 associated with switch $B_3$ and A switches to O subscripts. Dark Squares at positions 5, 29, 41 and 65 correspond to the capillaries energized by the switch closure shown in FIG. 5.

FIG. 9 shows a sequence of pulses which are the modulation envelope of the broadcast signal. A C pulse 162 causes a reset to position $B_1$. A pulses 163 are accumulated in serial to parallel register 16 and pulse $B_2$ clears the serial to parallel register. Pulses $A_6$, $A_4$, $A_3$, and $A_1$ are then accumulated and transfered to gates to control printing when pulse $B_3$ is received. Each square such as 160 is an elemental area of resolution from which a page is synthesized. Each such elemental area corresponds to a bit of informataion which is communicated by a pulse such as 163 or an absence of a pulse such as location 164. The signal shown in FIG. 9 can control any printing system in which a plurality of printing elements scan in unison.

Figure 10:
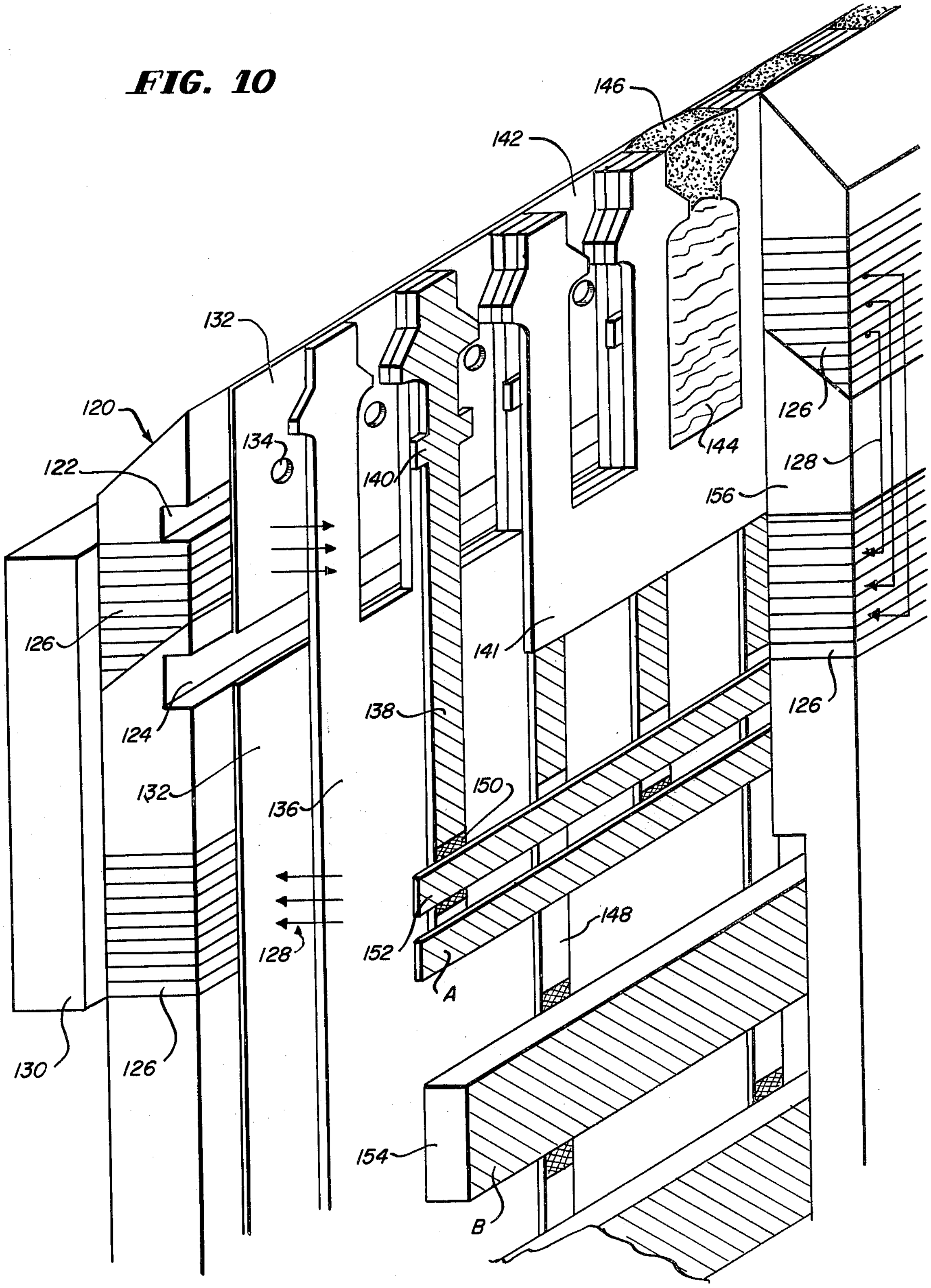
FIG. 10 is a highly schematic illustration showing a portion of a linear array of capillaries with crossing conductors connecting electrodes to switches.

FIG. 10 shows a structural portion of a linear array of capillaries with crossing conductors whic connect electrodes to switches. Portions of the assembly, which have complex shapes, can be fabricated from films by known methods such as photochemical etching. A supporting plate 120 spans the assembly. An ink channel 122, a mercury channel 124, and magnetic pole pieces 126 are provided. The ink mercury channels are connected to sources not shown. A magnetic field, represented by arrows 128, has its origin in a magnet 130 and in a similar magnet, not shown, which is adjacent to end piece 156.

Layer 132 is an electrical insulator, and has ports 134 opening into the ink channel 122. A second layer 136 is also an electrical insulator, and has its upper portion formed into a part of a capillary. A third layer 138 is an electrical conductor of low permeability which is formed into electrodes. A tab 140 projects from electrical conductor 138 into the capillary where it can contact mercury, while other portions of the electrode are recessed sufficiently to prevent contact with mercury. A fourth layer 141 is similar to layer 136.

One capillary is indicated as 142. An adjacent capillary is shown filled with mercury 144 which seals the ink ports while ink 146 remains in the upper portion of the capillary. The lower portion of the assembly shows some of the conductors which connect the electrodes to the A and B switches having the configuration shown in FIG. 5. An electrode is electrically isolated from a conductor by a thin dielectric film 148, and is electrically connected to a conductor by a thin bonding film 150. Only two of the conductors 154 which connect to the B switches are shown.

Figure 11:
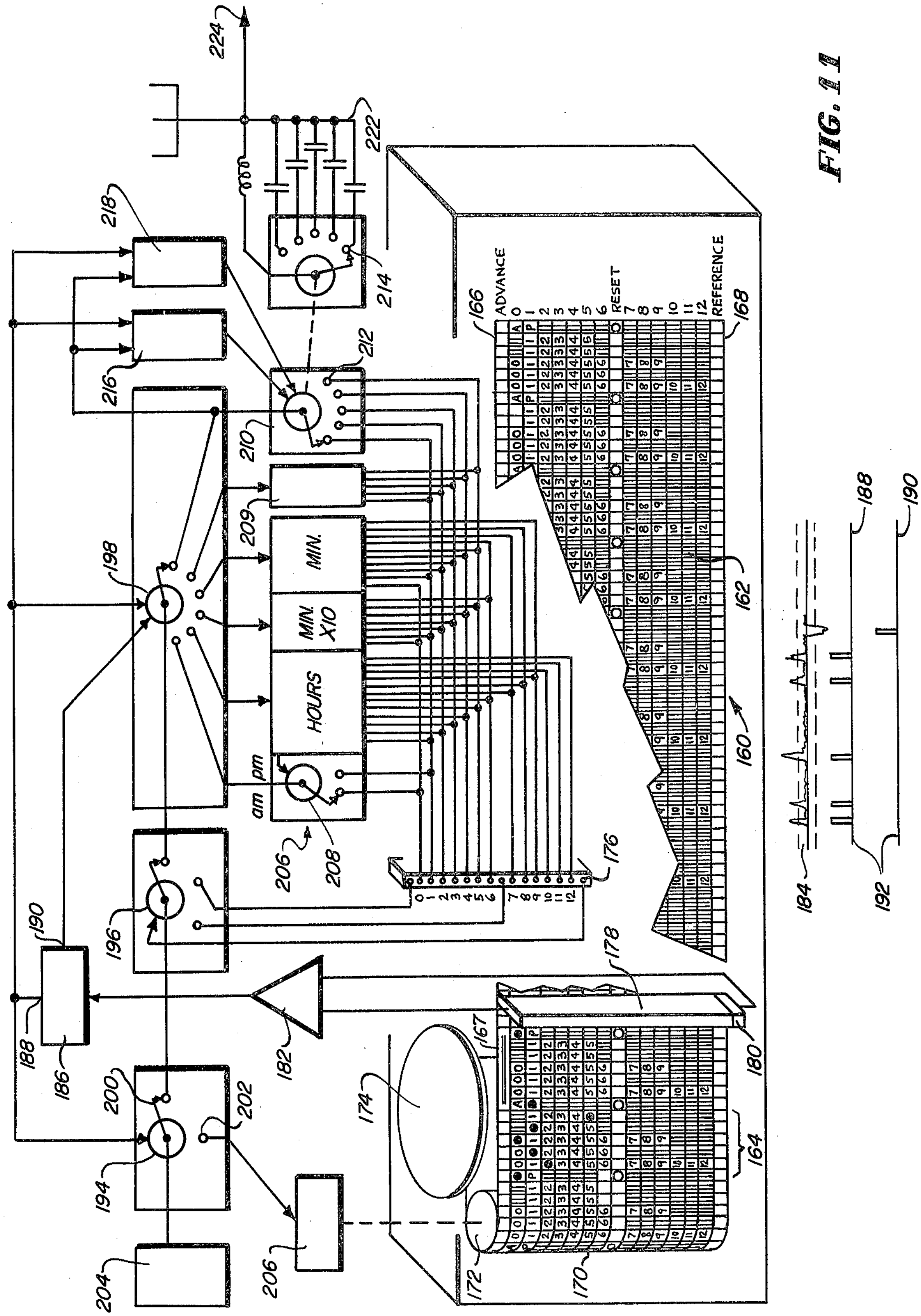
FIG. 11 is a schematic representation of a programmer using a marked tape which controls selection of pages.

The view of FIG. 11 illustrates a programmer for selecting the time and channel of a broadcast. A tape 160 made of ordinary paper is printed with a grid within which marks are made with a pen or pencil. A light source scans the tape and when the pencil mark is illuminated, the tape advances and scanning is repeated. Scanning is controlled by sequencing switches and a clock. Data is entered into columns 162 which are grouped into blocks 164. A block controls printing of a page. The first column of a block specifies time by AM or PM, the second column specifies hours, the third column specifies decade minutes, and the fourth column specifies unit minutes. The fifth column specifies the channel for printing, and the sixth column specifies the channel for recording and later printing.

The upper row 166 provides override advance. A pencilled mark 167 in upper row 166 causes the column to be skipped over, as is required if a marking error is made. The bottom row 168 is not marked, but rather provides a standard for light absorption which is compared to the other illuminated portions of the column. A center row 170 has punched holes which provide a reset signal. Unlike other rows, a signal is a high rather than a low light transmission. The holes engage sprockets of drive cylinder 172 which advances the tape one column at a time into take-up reel 174. A tape supply or feed roll is provided, but is not shown. As an example, block 164 instructs turn on at 2:10 A.M. to print channel 1 and record channel 5.

A signal is sensed by comparing light transmission through the reference row to light transmission through any other row. Transmission is low through a mark, substantially equal to the reference in the absence of a mark, and high through a hole. Light sources such as light emitting diodes called LED's 176 are assembled in a column. Each LED is positioned adjacent to a tape row 162. The LED adjacent to the reference row is on when any other LED, designated control LED, is on. The control LED's are on one at a time. A pair of light detectors generate a signal from the transmitted light. A control detector 178 detects light from the transmitted light. A control detector 178 detects light from control LED's and a reference detector 180 detects light from the reference LED. The detectors may be photoconductors such as cadmium sulphide.

A differential amplifier 182 compares the outputs of the control and reference photodetectors. The output of the differential amplifier is a sequence of positive and negative pulses shown at 184. The positive pulses result from a mark and are designated advance pulses. The negative pulses result from a punched hole and are designated reset pulses. The advance and reset pulses are shaped in discriminator 186 which may be a pair of trigger circuits. The advance pulses occur at output 188 and the reset pulses occur at output 190, both pulses being shown at 192. The advance and reset pulses control a switching function. Switch operators 194, 196 and 198 control the position of a switch, one of which is shown at 200. Contacts are provided one of which is shown at 202.

The switches transfer the output of voltage source 204. On an advance pulse, operator 194 causes switch 200 to connect the voltage source to tape drive 206 which indexes the drive cylinder. The switch then returns. Operator 196 responds to a rising voltage which occurs only when switch 200 returns to the position shown. Operator 196 causes a LED to first illuminate the tape's advance row, then the reset row, and then the switch returns. Operator 198 responds to advance and reset pulses. A reset pulse causes the switch to turn to an extreme counter-clockwise position. An advance pulse causes the switch to turn clockwise one position at a time. A clock 206 consists of AM-PM hours, decade minutes, and minutes portions. Each of these clock portions includes a step switch or ring counter whose terminals connect to one of the LEDs according to the time of day. The switch for AM-PM has only two outputs and is an alternator or flip-flop. When operator 208 is in the position shown, the LED designed 0 will turn on when operator 198 causes voltage to be applied. If a mark is in tape portion A, the tape advances one column and operator 198 turns the switch to hours. The LED having the same number as the hour will be on, and as the hours pass, the LEDs will light in sequence until a mark is adjacent when the tape advances. The decade minutes and minutes operate similarly.

The operations of the next two columns which select channels are similar, that is, operator 209 is similar to operator 210. The operator 210 drives coupled switches 212 and 214, and such operator 210 is controlled by gated multivibrator 216 and timer and reset 218. When operator 198 is in the position shown, voltage causes the multivibrator to oscillate. Each pulse causes operator 210 to advance one position. When a mark is sensed, an advance pulse turns the multivibrator off. Timer 218 is first preset by the voltage which turns on the multivibrator, and then the timer 218 is turned on by an advance pulse. When the time for printing a page elapses, the timer 218 turns off and a reset pulse causes operator 210 to return to the first channel.

Switch 214 steps with switch 212 and causes a tuned circuit to resonate at the selected channel frequency. The remaining portions of receiver 224 then process the graphical signal.

The claims of the invention are now presented, and the terms of such claims may be further understood by referring to the language of the specification and the views of the drawing.

What is claimed is:

1. In a method for printing by transmitting graphic information signals to a receiver having an ink capillary array spaced from a paper surface in an electrostatic field to induce travel of drops from selected capillaries in said array to such paper, the steps including partly filling each capillary with a body of mercury, developing a magnetic field in said capillary, inducing electric current in said capillaries so the resultant force moves the mercury in the capillary to expose a communicating port, introducing ink to a capillary through the communicating port under sufficient pressure to cause said ink to flow from said capillary, terminating the current flow and moving the body of mercury under pressure to again partly fill the capillary and to close the communicating port.

2. In a method which includes the steps of claim 1 above and which further includes selectively activating each capillary by the steps of selecting a capillary for printing operation, closing a first connection between an output of said capillary and a voltage source from a plurality of first connections, closing a second connection between another output of said capillary and said voltage source from a plurality of second connections to thereby induce an electric current in said capillary, and closing a third connection to reverse said outputs to provide a direction of current flow in accordance with the direction of the magnetic field.

3. In a printer which forms images by selective deposision of liquid ink on a receiving surface, means to control transfer of ink including a body of ink communicating with a port in a capillary, means to continuously impress pressure on said body of ink sufficient to cause said ink to flow into and from said capillary, a body of mercury under pressure movable in said capillary which normally blocks the ink port, means to provide a magnetic field in said capillary, and means to induce electric current in the capillary so that said body of mercury operates as a motor in moving under resultant force of the current in a magnetic field, and which body of mercury further operates as a valve to open said port by moving away from same and closing said port by covering same.

4. In a printer which includes the features of claim 3 which further includes means to induce said ink to form drops, said drops crossing a gap to be deposited on paper receiving surface.

5. In a printer which includes the features of claim 1 above, wherein a plurality of capillaries are present in an array spaced from a paper surface in an electrostatic field.

6. In a printer which includes the features of claim 5 above, wherein a common body of ink communicates with the ports in each of the capillaries in said array, and a common body of mercury communicates with each capillary and partly fills each capillary under pressure urgings, said bodies of ink and mercury being under predetermined hydrostatic pressures.

7. In a printer which includes the features of claim 5 above, wherein said magnetic field is provided by permanent magnet means positioned adjacent the capillary array.

8. In a printer which includes the features of claim 5 above, wherein said means to induce electric current is a pair of electrodes in each capillary, said electrodes connected by conductors to a voltage source, and means to selectively energize said electrodes to develop a potential therebetween so that the current between said electrodes moves across a magnetic field in said capillary and forces movement of the body of mercury in said capillary.

9. In a printer which includes the features of claim 8 above, in which said plurality of capillaries are present in a linear array, and which further includes switching means for selectively connecting the electrodes of each capillary to said voltage cource in accordance with transmitted electrical graphic information signals.

10. In a printer which includes the features of claim 9 above, wherein said switching means includes a first set of signal response switches each switch connected to only one of the electrodes in a pair, said connected pairs comprising a first subgroup of the total group of a plurality of capillaries and joined electrodes, a second set of signal responsive switches connected to the other electrode in the pair of connected electrodes in a subgroup other than said first subgroup, each capillary having a unique combination of switches from the first and second sets connected to its electrodes, and a third set of switches connected to the first two sets to change the polarity of the voltage to the first two sets of switches.

11. In a printer which includes the features of claim 10 above, wherein said first set of switches includes a serial to parallel register for providing selection for a plurality of capillaries simultaneously, and said second set of switches includes a stepping switch to provide capillary selection cyclically.

12. In a printer which includes the features of claim 1 above, wherein said first set of switches respond to signals clocked into said serial to parallel register.

* * * * *